(12) United States Patent
Sunamori et al.

(10) Patent No.: US 7,108,728 B2
(45) Date of Patent: Sep. 19, 2006

(54) PROCESS FOR PRODUCING COLORANTS

(75) Inventors: Takashi Sunamori, Funabashi (JP); Fumiyuki Kadowaki, Misato (JP); Hirofumi Ijiri, Yotsukaido (JP)

(73) Assignee: Taisei Chemical Industries, Ltd., Tokyo (JP)

( * ) Notice: Subject to any disclaimer, the term of this patent is extended or adjusted under 35 U.S.C. 154(b) by 166 days.

(21) Appl. No.: 10/733,447

(22) Filed: Dec. 12, 2003

(65) Prior Publication Data

US 2004/0205911 A1   Oct. 21, 2004

(30) Foreign Application Priority Data

Apr. 15, 2003   (JP) ............................... 2003-110438

(51) Int. Cl.
*C09B 67/18*   (2006.01)
*C09B 67/44*   (2006.01)
*C09D 11/02*   (2006.01)

(52) U.S. Cl. .................. 8/597; 8/598; 8/552; 8/938

(58) Field of Classification Search ..................... None
See application file for complete search history.

(56) References Cited

U.S. PATENT DOCUMENTS

| | | | | |
|---|---|---|---|---|
| 3,765,906 | A | * | 10/1973 | Yamaguchi et al. ........... 426/18 |
| 3,993,789 | A | * | 11/1976 | Moll et al. ................... 426/250 |
| 4,692,188 | A | | 9/1987 | Ober et al. |
| 4,802,989 | A | * | 2/1989 | Haruta et al. ................ 210/688 |
| 5,013,565 | A | * | 5/1991 | St. Martin et al. .......... 426/250 |
| 5,626,634 | A | * | 5/1997 | Goldmann et al. ............. 8/527 |
| 5,707,405 | A | * | 1/1998 | Caputo et al. ................. 8/527 |
| 5,840,106 | A | | 11/1998 | Krepski et al. |
| 6,031,019 | A | | 2/2000 | Tsutsumi et al. |
| 6,136,907 | A | * | 10/2000 | Sunamori et al. ............ 524/430 |
| 6,599,331 | B1 | * | 7/2003 | Chandler et al. ............... 8/611 |
| 6,793,724 | B1 | * | 9/2004 | Satoh et al. ............. 106/31.89 |

FOREIGN PATENT DOCUMENTS

| | | | |
|---|---|---|---|
| EP | 0 509 688 | * | 10/1992 |
| EP | 0 659 852 | | 6/1995 |
| EP | 0 924 272 A1 | * | 6/1999 |
| JP | 01 182379 | | 7/1989 |
| JP | 07 118586 | | 5/1995 |
| JP | 7228810 | | 8/1995 |
| JP | 7316242 | | 12/1995 |
| JP | 9012944 | | 1/1997 |
| JP | 10298294 | | 11/1998 |
| JP | 11 256083 | | 9/1999 |
| JP | 2000119141 | | 4/2000 |
| JP | 2000119571 | | 4/2000 |
| JP | 2000136335 | | 5/2000 |
| JP | 2000026560 | | 1/2001 |
| JP | 2001139854 | | 5/2001 |
| JP | 2002249687 | | 9/2002 |
| JP | 2002249689 | | 9/2002 |

* cited by examiner

*Primary Examiner*—Margaret Einsmann
(74) *Attorney, Agent, or Firm*—Paul E. White, Jr.; Manelli Denison & Selter PLLC

(57) ABSTRACT

The present invention provides a colorant for inkjet inks which is free from mechanical selectivity, high in light-durability, high in reliability and low in cost.

By paying attention to the chemical properties of coloring matter substances and utilizing the technical rules accumulated in the past faithfully to the properties of the coloring matter substances, an epoch-making process for producing fine-particulate colorants by a method comprising five simple steps is provided.

6 Claims, No Drawings

PROCESS FOR PRODUCING COLORANTS

BACKGROUND OF THE INVENTION (1) Field of the Invention

The present invention relates to colorants used in the IT-related machines and instruments.

More particularly, the present invention relates to colorants for color inks for use in the inkjet type printers utilizing the Piezo effect, bubble-jet type printers, etc. which are required to have a low viscosity and especially a low viscosity at high temperatures.

(2) Description of the Related Art

As the colorant of the color inks for use in the inkjet type printers, oily inks constituted of an oil-soluble coloring matter substance and an organic solvent were used at first. Recently, however, water-based inks containing a water-soluble coloring matter substance have been developed according to the needs of making inks aqueous, and are used prevailingly.

However, water-based inks containing a water-soluble coloring matter substance are apt to undergo photo-degradation of the color in printed matter, because the coloring matter substances used therein are low in durability to light. As is well known, the use of pigments having higher light-durability as the coloring matter substance is drawing attentions and a practical use of such pigments is being set forward.

Unlike soluble coloring matter substances that are present as molecules in a medium, the pigments as the coloring matter substance take a state of particles in a medium. Accordingly, the conversion from soluble coloring matter substance to pigments would have not become possible without the development of a dispersing technique of making the particle diameter of the pigment small to such an extent that the state of dispersion can be approximated to that in a solution. This fact is also known in the art.

It is well known that, regardless of the mode of the machine to be used, the inks for inkjet are essentially associated with a technique of transferring a liquid ink containing a chemical substance through a capillary at a high speed. Accordingly, one of the factors controlling the conditions of color is the chemical structure of a coloring matter substance in use. If this factor is excepted, the physico-chemical conditions which the liquid ink must satisfy are viscosity and those derived from the temperature dependency of viscosity. Specifically, said conditions include the viscosity of a medium, which controls the viscosity of the system, and the spatial size of the dissolved or dispersed solute, and the concentration and the temperature-dependence thereof.

The developmental efforts promoted from this point of view is to simultaneously develop a method for dispersing a coloring matter substance into fine particles, and a dispersant that aids the dispersion of a coloring matter substance, which cannot disperse by itself into fine particles, without increasing the viscosity of the system, as an essential ingredient. The examples thereof include a combination of mechanical and chemical dispersing forces (JP-A-2000-119571), a method for chemical production of fine particle dispersion (JP-A-10-298294, JP-A-2000-119141, and JP-A-316242), a technique relating to an amphoteric resin having a dispersing performance (JP-A-2000-026560), etc.

On the other hand, regarding the improvement of a colorant containing a water-soluble coloring matter substance which takes advantage of the water-solubility, a combination of a water-soluble coloring matter substance and an amino acid, which is an amphoteric electrolyte, or the like (JP-A-2001-139854, JP-A-2000-136335, JP-A-9-12944, and JP-A-7-228816) can be referred to.

Further, an attempt to improve the water-resistance of a water-soluble dye type coloring matter substance by combining an oily dye type coloring matter substance, in place of a pigment, with a water-soluble resin dispersant (JP-A-2002-249689 and JP-2002-249687) is also reported.

As above, the development of inkjet inks for making the most of the characteristic features of a coloring matter substance according to the properties of the coloring matter is ceaselessly continued at the present time. Nevertheless, the study has not yet reached the completion of the development, namely the provision of an ink capable of sufficiently fulfilling the required quality.

Reviewing the actual situation, the following can be pointed out. Thus, though pigment type inks are advantageous in terms of durability, they require pulverization into fine particles, thus the use of a high performance, expensive dispersing machine for the manufacture. Further, they require a polymeric dispersant which limits the lowering of viscosity and, as a result, the instruments in which such a ink is suitably usable are also limited (selectivity of instruments).

The method of using an oily dye type coloring matter substance as an aqueous dispersion is not so greatly different from the above-mentioned pigment system, because it requires a dispersing machine and uses a dispersant.

Although the method of improving the light-durability of a water-soluble water-based dye is epoch-making, this method seems to remain unreliable as it essentially uses an photo-degradable coloring matter substance and requires a photodegradation-inhibiting agent.

SUMMARY OF THE INVENTION

As above, all the conventional colorants are meritorious in some point, but they are de-meritorious in some other point. Thus, it has been waited for to develop an colorant for inkjet inks that can overcome the above-mentioned problems of the conventional colorants and is free of the selectivity of instrument, high in the light-durability, high in reliability and inexpensive.

Accordingly, it is an object of the present invention to provide the above-mentioned "colorant for inkjet inks that is free of the selectivity of instrument, high in light-durability, high in reliability and inexpensive" by using chemical and physical means.

With the aim of solving the above-mentioned problem, the present inventors have conducted extensive studies. As a result, the present invention has been achieved by the technical means described below.

In the first place, the inventors studied on how the degradation of coloring matter substance by light takes place. As a result, the mechanism of the photo-degradation could be comprehended to some extent.

Concretely speaking, the photo-degradation reaction of water-soluble dyes was analyzed and found out to involve the changes of the color density, i.e. the absorbance, of the dye upon exposure to light in an accelerating manner with time, or to progress as if it were an "autocatalytic" reaction as in chemical reactions, in other words. It was found reasonable to understand that the degradation progresses in such a manner that once coloring matter molecules undergo photo-degradation into the degradation product, the said degradation product then make adjacent normal coloring matter molecules degrade. It was actually ascertained that a coloring matter substance present in a membrane shows a greater extent of photo-deterioration than the same coloring matter substance present in a solution.

In the second place, the inventors thought about what coloring matter substance should be selected for satisfying the object of the present invention. As a result, there was arrived at a conclusion that since a water-soluble coloring matter, unlike an oil-soluble coloring matter, is imparted with an additional function of water-solubility, an oil-soluble coloring matter is considered to have higher chemical stability than a water-soluble coloring matter, and thus is preferable.

In the third place, the problem of aggregation was thought about. Thus, whether it belongs to a dye or a pigment, a coloring matter substance forms aggregates or associated matter, around an impurity electrolyte as a nucleus. It was found that such aggregates or associated matter can be broken down by applying an ion-exchange technique, whether the medium is water or an organic solvent.

In the fourth place, there was a problem that, when a solution of an oil-soluble coloring matter in an organic solvent is used, it is desirable to convert the organic medium to an aqueous medium (phase conversion). The inventors found that this phase conversion can be easily carried out by bringing a coloring matter substance into a state of being solubilized as completely as possible, breaking down the fraction of the substance still remaining in the state of aggregates or association by an ion exchange technique and, while maintaining the solution in the above-mentioned state, portion-wise dropping the solution into an aqueous phase in which an amphoteric substance is dissolved. This is probably due to a fact that the amphoteric substance has an effect of stabilizing an electrolyte impurity by acting as a group opposite to the impurity that are apt to make the coloring matter substance re-aggregate after the phase conversion, regardless whether the impurity is an acid or a base (U.S. Pat. No. 3,652,478).

Further, in the colorant of the present invention, it is an essential condition that the coloring matter substance is a fine-particulate substance, so that, needless to say, the coarse particles which may exist unwillingly have to be removed.

Thus, according to one aspect, the present invention provides a process for producing a colorant comprising a hydrophobic coloring matter substance, an amphoteric electrolyte and water, which comprises:

dissolving a hydrophobic coloring matter substance in an organic solvent miscible with water to obtain a coloring matter substance solution in which the concentration of the hydrophobic coloring matter substance is in the range of 1–10 wt %;

contacting the coloring matter substance solution with an anion exchange resin and/or a cation exchange resin to obtain a purified coloring matter substance solution;

adding dropwise, while stirring, the purified coloring matter substance solution into a solution containing an amphoteric electrolyte in de-ionized water at a concentration of 10 wt % or less to obtain a water-containing organic solvent solution of the purified coloring matter substance; and removing the organic solvent from the water-containing organic solvent of the purified coloring matter substance by an azeotropic distillation of water and the organic solvent, while supplying de-ionized water and/or an organic solvent if necessary, optionally under an ambient or a reduced pressure to obtain an aqueous solution of the coloring matter substance and amphoteric electrolyte.

Further, according to another aspect, the present invention provides the above-mentioned process wherein said solution of amphoteric electrolyte in de-ionized water is an aqueous solution of the coloring matter substance and amphoteric electrolyte obtained by a step of removing the organic solvent fraction by an azeotropic distillation or a step of high-speed centrifugation thereafter.

PREFERRED EMBODIMENT OF THE INVENTION

The embodiments of the present invention will be described below in more detail.

In the present specification, the steps included in the process of the present invention are called "Steps 1 to 5". However, the numbering used herein is only for the purpose of clarification, and it does not restrict the order of carrying out the steps. An embodiment of using a product of Step 4 or Step 5 in Step 3 also falls within the spirit and scope of the present invention, as mentioned in the description given below.

The process for producing a colorant of the present invention characterized by superiority in light-durability of hydrophobic coloring matter and stability of aqueous solution includes a step of dissolving a powdery hydrophobic coloring matter substance in a water-miscible organic solvent (Step 1).

The hydrophobic coloring matter substance used in the process of the present invention is preferably in a powdery form. In the present invention, an oil-soluble dye is mainly supposed as the hydrophobic coloring matter substance. The oil-soluble dyes usable in the present invention include SY146, SY88, SY25, SY89, SY79, SY83-1, SY83, SY62, SY79, SY32, SY19, SY81, SY82, SR130, SR233, SR125, SR122, SR127, SR92, SR124, SR89, SR8, SR91, SR109, SR119, SR160, SR118, SR132, SR218, SB136, SB45, SB44, SB70, SB38, etc. as indicated by C. I. No.

In the present invention, a pigment can be also used as the hydrophobic coloring matter substance. The color of a pigment depends on the chemical structure of the pigment. The resistance to an organic solvent of a pigment is also governed by its chemical structure and varies. Accordingly, it is needless to say that a pigment can be used in the present invention so far as its resistance to an organic solvent is not high, as it can be dispersed in a similar manner to the manner in which an oil-soluble dye disperses. Further, some pigments, depending on their chemical structures, can be dispersed into an organic solvent to have a dissolved state close to that of oil-soluble dyes, by simply mixing the pigments with the organic solvent. Such pigments are also usable in the process of the present invention.

The organic solvent used in this step is not particularly limited, so far as it can dissolve a hydrophobic coloring matter substance well and is miscible with water because in the subsequent step it is to be added dropwise into and thus diluted with an aqueous solution of an amphoteric electrolyte (e.g. an amino acid). The organic solvents which can be used include isopropyl alcohol, ethyl alcohol, methanol, acetone, tetrahydrofuran, ethylene glycol, monoalkyl ether derivatives of ethylene glycol, propylene glycol, monoalkyl ether derivatives of propylene glycol, glycerin, diethylene glycol, alkyl ether derivatives of diethylene glycol, and the combination thereof. Of these organic solvents, particularly preferable is isopropyl alcohol.

In this step, a coloring matter substance can be dissolved in the above-mentioned organic solvent according to the methods known to a person skilled in the art, by using a dissolving tank equipped with, for example, a heating device, a reflux condenser, and a stirrer, etc. and by stirring the system, if desired.

Next, the step of purifying the solution of coloring matter substance obtained above (Step 2) will be explained.

In the present invention, purification is carried out by subjecting the solution of coloring matter substance obtained above to an ion exchange treatment. As the method of ion exchange, those known to a person skilled in the art, such as contacting the solution with an ion exchange resin by the use of an ion exchange tower, etc. can be referred to. Preferably, it can be carried out by adding an anion exchange resin previously activated into the OH form and/or a cation exchange resin previously activated into the H form, which has been pulverized so as to have a particle size distribution between 10 µm and 1,000 µm and optionally dried, to the solution of coloring matter substance obtained above in an amount of 0.1–10 wt %, followed by agitation and the removal of the powdery ion exchange resin.

In the case where both the cation-exchange and anion-exchange are carried out, it is allowable to carry out the cation exchange first and subsequently carry out the anion exchange after the removal of the cation exchange resin used. Otherwise, it is also possible to add the two types of powdery exchange resins simultaneously and agitate the system to carry out both the cation-exchange and the anion-exchange. Further, it is also allowable to repeat the two ion exchange treatments alternately. The ion exchange using an ion exchange resin powder brings about an equal ion exchanging effect whether the medium is an organic solvent or water.

The ion exchange resin that can be used in this step may be any of strong base-type anion exchange resins, weak base-type anion exchange resins, strong acid-type cation exchange resins and weak acid-type cation exchange resins. The structure of the ion exchange resin is not particularly limited. That is to say, the resins may be any of porous type and gel type. Principally, the type of ion exchange resin and the structure thereof should be selected in consideration of the properties of the target electrolyte and the pH value of the dispersion. Preferable ion exchange resins are DIAION SA-20A and DIAION WK-10 which are a strong base-type anion exchange resin and a weak acid-type cation exchange resin, respectively, since they generally work well when used in a usual manner.

As the time period of the ion exchange, 30 minutes or longer is enough for the purpose.

For powdering an ion exchange resin, a ball mill, a mortar type pulverizing machine, and a stone mill type pulverizing machine can be used.

For removing the resin powder from the solution of a coloring matter substance after the ion exchange, a method of filtration under an elevated pressure using a filter material capable of capturing the particles in the perpendicular direction with respect to the filter material surface or using a filter aid exhibiting a similar function can be used.

The process of the present invention further includes a step of dropwise adding, with stirring, the purified solution of coloring matter substance into a solution containing an amphoteric electrolyte in de-ionized water at a concentration of 10% or less to obtain a water-containing organic solvent solution containing said purified coloring matter substance and said amphoteric electrolyte (Step 3).

The de-ionized water used in this step preferably has an electrical conductivity of 5 µS/cm or less.

The concentration of the coloring matter substance in the water-containing organic solvent solution obtained in this step is not particularly limited, but it can be varied depending on the applications. In the case of an ink for inkjet, the concentration is preferably 1–5 wt %.

The solution of the amphoteric electrolyte in the de-ionized water used in this step may be an aqueous solution obtained by merely dissolving an amphoteric electrolyte in de-ionized water, or in an aqueous solution containing a coloring matter substance and an amphoteric electrolyte obtained in Step 4 mentioned below or through Steps 4 and 5 mentioned below. That is to say, this step involves an aspect of dropwise adding the purified solution of coloring matter substance obtained in Step 2 into the aqueous solution of purified coloring matter substance and amphoteric electrolyte obtained by subjecting the water-containing organic solvent solution containing the purified coloring matter substance and amphoteric electrolyte obtained in this step to Step 4 or to Steps 4 and 5 mentioned below, too. An advantage of this aspect lies in that Step 3 can be carried out always under the fixed dropping and dilution conditions, and as a result a stable concentrate solution can be obtained.

As the amphoteric electrolyte used in this step, amino acids are preferred. Amino acids having an isoelectric point of 6 or above, namely arginine, histidine and glycine, are more preferred.

Further, as the amphoteric electrolyte usable in this step, in addition to the amino acids, oligomers, i.e. the low molecular weight products synthesized by the polymer synthesis and having a weight average molecular weight of 1,000 or less and therefore not classified as resin, such as amphoteric copolymers formed from hydrophobic monomers such as methacrylic acid, dimethylaminoethyl (meth) acrylate, 2-hydroxyethyl (meth)acrylate, other alkyl (meth) acrylates, styrene, etc. can also be used.

Next, Step 4 will be explained below.

This is a step for removing the organic solvent from the water-containing organic solvent solution comprising purified hydrophobic coloring matter substance and amphoteric electrolyte obtained in Step 3, to obtain an aqueous solution containing the coloring matter substance and the amphoteric electrolyte.

For this purpose, an azeotropic distillation of water and an organic solvent is carried out by the use of a distillation apparatus equipped with a temperature controlling device, a refluxing device, a pressure-reducing device and a stirring function, optionally under a reduced pressure, to convert the system to a solution system of water only. Since the concentration rises with the progress of the step, de-ionized water and/or organic solvent can be appropriately added in the course of the step, according to the need. This is a conventional technique of solvent substitution (phase conversion) with water well known to a person skilled in the art.

Since the solution thus obtained contains some quantity of coarse particles, the solution may be afterwards subjected to a high-speed centrifugation (Step 5). Although the number of rotation can be appropriately decided according to the coarseness, a preferable number of rotation is 5,000–15,000 rpm.

Thus, there can finally be obtained a colorant comprising water and said purified hydrophobic coloring matter substance reduced in the content of impurity electrolyte and coarse particle of coloring matter substance and containing said amphoteric electrolyte as essential ingredient.

Additionally speaking, the aqueous solution containing a coloring matter substance and an amphoteric electrolyte obtained in Step 4 or Steps 4 and 5 can be used as the aqueous solution containing amphoteric substance of Step 3, as has been mentioned above.

Next, the present invention will be explained in more detail with reference to examples.

EXAMPLE 1

Step 1 and Step 2 in the present invention were carried out in the following manner. Firstly, a solution having the following formulation was dissolved at the ambient temperature using a four-necked 2 L flask equipped with a reflux condenser, a stirrer and a dropping funnel:

| | |
|---|---|
| Blue coloring matter substance SB 70 (VALIFAST BLUE 2606, manufactured by Orient Kagaku) | 25 parts by wt. |
| Isopropyl alcohol | 475 parts by wt. |

On the other hand, 50 parts by weight of a strong base-type anion exchange resin SA-20A (DIAION, manufactured by Mitsubishi Kagaku) previously activated into OH form and thoroughly washed, from which water was removed with a filter paper was prepared. After finely pulverizing the resin in a mortar, 25 parts by weight of the pulverized resin was taken and added to the above-mentioned solution. The mixture thus obtained was stirred at ambient temperature for 30 minutes. At this time, the powdery ion exchange resin had a granular size of 10–800 µm as measured in water by means of CAPA 500 (optical particle size-measuring device manufactured by Horiba, Co., Ltd.).

Next, the solution obtained above was carefully filtered under a pressure of 0.2 mPa or less with a filter material prepared by laying an industrial one-side flannel filter cloth on an industrial filter paper No. 126, to obtain a transparent colored solution.

The solution thus obtained was divided into portions and introduced into a plurality of the same flasks. A portion of the solution in the first flask was dropwise added into a solution prepared by diluting a 9% aqueous solution of arginine with de-ionized water, under stirring. The resulting mixture was heated as it was, and distilled and concentrated under reduced pressure, and cooled. Next, another portion of the above-mentioned transparent colored solution was dropwise added to the concentrated and cooled solution obtained just above. By repeating the same procedure of concentrating the solution by distillation under reduced pressure and adding thereto the colored solution, an aqueous solution containing 5% of coloring matter substance was finally obtained. In total, dropping into an aqueous solution containing arginine only was carried out once, and dropping into the distilled aqueous solution containing the coloring matter substance and arginine was repeated three times. The overall number of dropping was thus four. The content of the procedure, and the change of the properties of the liquid during the operation are summarized in Table 1.

TABLE 1

| | | No. of times of adding dye solution | | | |
|---|---|---|---|---|---|
| | | 1st | 2nd | 3rd | 4th |
| | | \multicolumn{4}{c}{Solution number} | | | |
| Step | | (1) | (2) | (3) | (4) |
| Step 3 | Dye solution (parts by wt.) | 100 | 100 | 100 | 100 |
| | De-ionized water, DIW (parts by wt.) | 178 | | | |
| | 9% Aqueous solution of arginine (parts by wt.) | 222 | | | |
| | Used solution (1) (parts by wt.) | | 400 | | |
| | Used solution (2) (parts by wt.) | | | 400 | |
| | Used solution (3) (parts by wt.) | | | | 400 |
| | Total | 500 | 500 | 500 | 500 |
| Step 4 | Theoretical values after removal of IPA | | | | |
| | Dye concentration | 1.25% | 2.50% | 3.75% | 5.00% |
| | Arg concentration | 5.00% | 5.00% | 5.00% | 5.00% |
| | Dye/Arg | 1/4 | 2/4 | 3/4 | 4/4 |
| | Properties after removal of IPA | | | | |
| | Amount of removal (parts by wt.) | 90.7 | 113.3 | 110.1 | 137.5 |
| | Particle diameter | | | | |
| | D10% | 0.015 | 0.020 | 0.026 | 0.037 |
| | D50% | 0.023 | 0.028 | 0.038 | 0.053 |
| | D90% | 0.051 | 0.070 | 0.158 | 0.151 |
| | Nonvolatile residue (%) | | 7.74 | 9.72 | 13.30 |

TABLE 1-continued

|  | No. of times of adding dye solution | | | |
|---|---|---|---|---|
|  | 1st | 2nd | 3rd | 4th |
|  | | Solution number | | |
| Step | (1) | (2) | (3) | (4) |
| Centrifugation 11000 rmp × 10 min | | | | |
| D10% | | 0.015 | 0.020 | 0.025 |
| D50% | | 0.022 | 0.032 | 0.041 |
| D90% | | 0.044 | 0.059 | 0.085 |
| Nonvolatile residue (%) | | 7.42 | 9.17 | 12.45 |
| Yield | | 95.9% | 94.3% | 93.6% |
| Characteristic properties | | | | |
| pH | | 10.93 | 10.77 | 10.72 |
| Conductivity (μs/cm) | | 523 | 800 | 1018 |
| Surface tension (mN/m) | | | | 41.6 |
| Viscosity (mPa · s) | | | | |
| 50 rmp | | | | 2.94 |
| 100 rmp | | | | 2.94 |

As shown in Table 1, there was obtained a colorant, namely a transparent colored solution, which was very fine and sharp in the particle size distribution, at high yield.

Similar processes to the above was carried out by using histidine and glycine in stead of arginine. The results obtained were similar to the above.

EXAMPLE 2

The colorant obtained in Example 1 was compared with a commercially available inkjet ink of the same color, and their light-durabilities were measured.

Thus, each of the solutions was coated onto a hiding chart and exposed to the Fade-Ometer. The change in OD value was monitored. The results are shown in Table 2.

The results shown in Table 2 demonstrate that the colorant of the present invention have light-durability comparable to that of pigment type colorants.

EXAMPLE 3

On the Colorant (4) obtained in Example 1, a letter-printing test was carried out with a home-made testing machine using a commercially available printer. The results were as shown in Table 3.

The inking property was evaluated on a scale of one to five. An ink to be tested was introduced into an ink-cartridge of a commercially available printer. In the test, solid printing on 50 sheets of paper with the size of A4 was continuously carried out for each ink sample, and the printing property

TABLE 2

|  |  | System | The present invention | Commercial product | Commercial product |
|---|---|---|---|---|---|
|  |  | No. | (3) | Water-soluble dye system | Pigment system |
|  |  | Coloring matter substance | SB-70 | | |
|  |  | Dye concentration % | 3.75 | | |
|  |  | Amino acid concentration % | 2.5 | | |
| OD | Day No. | 0 | 1.03 | 1.02 | 1.39 |
|  |  | 1 | 1.03 | 1.01 | 1.38 |
|  |  | 4 | 0.99 | 0.96 | 1.38 |
|  |  | 7 | 0.97 | 0.88 | 1.35 |
|  |  | 14 | 0.93 | 0.8 | 1.29 |
| Rate of change (%) | Day No. | 0 | 100 | 100 | 100 |
|  |  | 1 | 100.00 | 99.02 | 99.28 |
|  |  | 4 | 96.12 | 94.12 | 99.28 |
|  |  | 7 | 94.17 | 86.27 | 97.12 |
|  |  | 14 | 90.29 | 78.43 | 92.81 | was evaluated based on continuous printability and the degree of thin spot generation. Specifically, the evaluation of printing property was based on the following criteria:

Five Points: Continuous printing on more then 50 sheets was achieved, without any thin spot;
Four Points: Continuous printing on more than 50 sheets was achieved, but with slight generation of thin spots;
Three Points: Continuous printing on more than 50 sheets was achieved, but with partial generation of thin spots;
Two points: Continuous printing was possible only on sheets less than 50 or significant number of thin spots were generated; and
One point: Printing was impossible.

Water resistance of the inks was also evaluated on a scale of one to five as follows. A solid printed matter was brushed back and forth on a printed surface for three times with a brush containing tap water, within 30 minutes after the solid printing. The states of the brush and the printed surface after the brushing were visually observed and evaluated based on the criteria:

Five Points: No color fading was observed;
Four Points: Slight color fading on printed surface was observed;
Three Points: Slight color fading on printed surface and coloration of brush were observed;
Two Points: Significant color fading on printed surface and coloration of brush were observed; and
One Point: Complete color fading on printed surface was observed.

Marring of the inks was evaluated on a scale of one to five as follows. A small piece of printing paper was placed onto a printed surface of the solid printing matter within 30 minutes after the solid printing. A load of 200 g/cm² was then applied onto the piece and the piece was dragged on the printed surface with the load at a speed of 3 cm/sec. for a distance of 10 centimeters. Marring was evaluated based on the degree of color migration onto a part of the piece of printing paper contacted with the colored surface, based on the following criteria:

Five points: No color migration was observed;
Four points: Very slight color migration was observed;
Three points: Slight color migration was observed;
Two points: Color migration and some color fading on printed surface were observed;
One point: Color migration and color fading on printed surface were observed.

Storage stability of Colorant (4) was evaluated by storing Colorant (4) at 60° C. and measuring the particle size distribution thereof one day, four days and seven days later. The results of the evaluation of storage stability are summarized in Table 4.

TABLE 3

| Ink formulation | The present invention | |
|---|---|---|
| Example 1 colorant (4) | 48.4 | Commercially available water-soluble dye type ink |
| IPA | 3 | |
| Diethylene glycol | 10 | |
| Glycerin | 5 | |
| DIW | 33.5 | |
| Total (parts by wt.) | 100 | |
| Filtering characteristic | 0.8 μm Membrane OK | |

TABLE 3-continued

| Ink formulation | The present invention | |
|---|---|---|
| Properties Particle diameter | | |
| D10% | 0.026 | |
| D50% | 0.042 | |
| D90% | 0.091 | |
| Surface tension | 38.0 | 28.9 |
| Viscosity | | |
| 50 rpm | 3.06 | 2.48 |
| 100 rpm | 0.06 | 2.48 |
| Inking property BC-30 Head (Black) | | |
| Inking property | 4 | 5 |
| Dot diameter | 80 μm | |
| OD value *1 Paper CP 250 | | |
| None | 0.67 | 0.92 |
| R | 0.91 | 1.21 |
| G | 0.43 | 0.63 |
| B | 0.24 | 0.33 |
| Glossy paper Sp 101 | | |
| None | 0.75 | |
| R | 1.52 | |
| G | 0.37 | |
| B | 0.15 | |
| Water resistance | 3 | 1 |
| Marring | 5 | 5 |
| BC-31 Head (Color) | | |
| Inking property | 1 | 5 |

*1 OD value was measured with Macbeth concentration meter for transmission and reflection (Sakata Inks Co., Ltd., TR-927V).
None: visual (400–700 μm filter); R: Red filter was used; G: Green-Red filter was used; B: Blue-Red filter was used.

TABLE 4

| Example 1 colorant (4) | |
|---|---|
| Characteristic properties | |
| Nonvolatile residue (%) | 12.5 |
| pH | |
| Viscosity 50 rpm | 2.94 |
| 100 rpm | 2.94 |
| Particle diameter D10% | 0.025 |
| D50% | 0.041 |
| D90% | 0.085 |
| Conductivity (μS/cm) | 1018 |
| Surface tension (mN/m) | 41.6 |
| 60° C. Storage stability 1 day later | |
| D10% | 0.028 |
| D50% | 0.045 |
| D90% | 0.082 |
| 4 days later | |
| D10% | 0.024 |
| D50% | 0.040 |
| D90% | 0.085 |
| 7 days later | |
| D10% | 0.025 |
| D50% | 0.040 |
| D90% | 0.084 |

Thus, it was found that the dye type ink tested herein was sufficiently improved in water-durability, so that the ink was practically usable. It was also found that the colorant of the present invention is superior in storage stability.

COMPARATIVE EXAMPLE 1

The process of Example 1 was repeated, except that Step 2 was omitted in one test and Step 3 was carried out without using the amphoteric electrolyte in the other test. The results are summarized in Table 5.

TABLE 5

| | | System without Step 2 | | | System without amphoteric electrolyte |
|---|---|---|---|---|---|
| | | No. of times of adding dye solution | | | |
| | | 1st time | 2nd time 3rd time | 1st time | |
| | | Solution number | | | |
| Step | | H(1) | H(2) | H(3) | K(1) |
| Step 3 | Phase change Formulation | | | | |
| | Dye solution | 100 | 100 | 100 | 100 |
| | DIW | 178 | | | 400 |
| | Alginine (q %) | 222 | | | 0 |
| | H(1) | | 400 | | 0 |
| | H(2) | | | 400 | 0 |
| | Total (parts by wt.) | 500 | 500 | 500 | 500 |
| Step 4 | Theoretical values after removal of IPA | | | | |
| | Dye concentration | 1.25% | 2.50% | 3.75% | 1.25% |
| | Arg concentration | 5.00% | 5.00% | 5.00% | 0.00% |
| | Dye/Arg | 1/4 | 2/4 | 3/4 | 1/0 |
| | Properties after removal of IPA | | | | |
| | Amt. removed (parts by wt.) | 89.2 | 104 | 105.6 | 100.2 |
| | Particle size distribution | | | | |
| | D10% | | 0.033 | 0.063 | 0.053 |
| | D50% | | 0.054 | 0.220 | 0.105 |
| | D90% | | 0.142 | 2.393 | 0.327 |
| | Nonvolatile residue (%) | | | 8.3 | 1.13 |
| Step 5 | Centrifugation 11000 rmp × 10 min | Stopped due to the generation of coarse particles | | | |
| | D10% | | | | 0.0458 |
| | D50% | | | | 0.0839 |
| | D90% | | | | 0.1849 |
| | Nonvolatile residue (%) | | | | 0.76 |
| | Yield (Nonevolatile residue, %) | | | | 67.20% |

The results of this example demonstrate the necessity of Step 2 and the necessity of the amphoteric electrolyte.

According to the present invention, a method for providing a colorant for inkjet inks which is high in light-durability and low in price was accomplished. Accordingly, the present invention much contributes to production processes of the existing colorants in this field and the colorants expected to be developed in the future.

What is claimed is:

1. A process for producing a colorant comprising a hydrophobic coloring matter substance, an amphoteric electrolyte and water, said process comprising:

Dissolving and/or dispersing the hydrophobic coloring matter substance in an organic solvent miscible with water to obtain a coloring matter substance solution in which the concentration of the hydrophobic coloring matter substance is in the range of 1–10 wt %;

contacting said coloring matter substance solution with an anion exchange resin and/or a cation exchange resin to obtain a purified coloring matter substance solution;

adding dropwise, while stirring, said purified coloring matter substance solution into a solution containing an amphoteric electrolyte, being an amino acid or an amphoteric oligomer having a weight average molecular weight of 1,000 or less, in de-ionized water at a concentration of 10 wt % or less to obtain a water-containing organic solvent solution of the purified coloring matter substance;

removing the organic solvent component from the water-containing organic solvent solution of the purified coloring mailer substance by an azeotropic distillation of water and said organic solvent, while supplying de-ionized water and/or an organic solvent if necessary, under an ambient or a reduced pressure, to obtain an aqueous solution containing the coloring matter substance and the amphoteric electrolyte;

subjecting said aqueous solution containing a coloring matter substance and an amphoteric electrolyte to high-speed centrifugation; and collecting as a product, a resulting aqueous colorant composition containing said coloring matter substance and an amphoteric electrolyte.

2. A process according to claim 1, wherein the solution containing the amphoteric electrolyte in de-ionized water is the aqueous colorant composition containing said coloring matter substance and an amphoteric electrolyte.

3. A process according to claim 1, wherein said hydrophobic coloring matter substance is an oil-soluble dye and said amphoteric electrolyte is an amino acid.

4. A process according to claim 1, wherein said hydrophobic coloring matter substance is an oil-soluble dye and said amphoteric electrolyte is an amphoteric electrolyte having an isoelectric point of 6 or higher.

5. A process according to claim 1, wherein said hydrophobic substance is an oil-soluble dye and said amphoteric electrolyte is arginine, histidine, glycine or combination thereof.

6. An aqueous colorant composition consisting of the product made according to the process of claim 1.

* * * * *